United States Patent [19]

Münzmay et al.

[11] Patent Number: 5,100,995
[45] Date of Patent: Mar. 31, 1992

[54] STORAGE STABLE POLYURETHANE ADHESIVES

[75] Inventors: Thomas Münzmay, Dormagen; Horst Stepanski, Leverkusen; Walter Meckel, Neuss, all of Fed. Rep. of Germany

[73] Assignee: Bayer Aktiengesellschaft, Leverkusen Bayerwerk, Fed. Rep. of Germany

[21] Appl. No.: 581,498

[22] Filed: Sep. 12, 1990

[30] Foreign Application Priority Data

Sep. 23, 1989 [DE] Fed. Rep. of Germany ....... 3931844

[51] Int. Cl.$^5$ .............................................. C08G 18/80
[52] U.S. Cl. ........................................ 528/45; 528/61; 528/65; 528/905; 156/331.4; 156/331.7
[58] Field of Search ............... 528/45, 61, 65, 905; 156/331.4, 331.7

[56] References Cited

U.S. PATENT DOCUMENTS 4,409,340 10/1983 Stolzenbach et al. ................. 528/45

FOREIGN PATENT DOCUMENTS 125009 11/1984 European Pat. Off. .
3230009 3/1983 Fed. Rep. of Germany .

*Primary Examiner*—Maurice J. Welsh
*Assistant Examiner*—Rachel Johnson
*Attorney, Agent, or Firm*—Joseph C. Gil; Godfried R. Akorli

[57] ABSTRACT

The present invention is directed to a predominantly linear polyurethane adhesive which can be cross-linked by heat and is at least partially crystalline at room temperature, comprising:

a) a polyurethane prepolymer which contains masked isocyanate groups and is at least partially crystalline, and is prepared by reacting:

a1) at least one at least partially crystalline organic polyhydroxyl compound having a molecular weight above 400, being selected from the group consisting of polyesters and polycarbonates, and a2) a polyisocyanate component consisting of at least one organic polyisocyanate having a functionality of at least 2.

a3) at least one monofunctional isocyanate blocking agent, and a4) optionally a polyhydroxyl compound having a hydroxyl functionality of at least 2 and a molecular weight below 500, in which the equivalent ratio of isocyanate groups of component a2) to the sum of isocyanate reactive groups of components a1) and a4) is kept in the range of from 1.1:1 to 3:1, and the equivalent ratio of the isocyanate groups resulting from the ratio of components a1) and a4) to a2) to the monofunctional blocking agents a3) is kept in the range of from 0.8:1 to 1.15:1, and b) at least one low molecular weight amine functional and/or hydroxyl functional chain lengthening or cross-linking agent having a molecular weight of from 32 to 500, and having a functionality of at least 2.

7 Claims, No Drawings

STORAGE STABLE POLYURETHANE ADHESIVES

BACKGROUND OF THE INVENTION

The present invention relates to polyurethane adhesives which are at least partially crystalline at room temperature.

Thermoplastic polyurethane adhesives which acquire their strength from the increase in viscosity and/or crystallization upon cooling are well known in the art. These polymer adhesives must be substantially linear in structure to enable them to be worked up and therefore have little adhesive strength at elevated temperatures (see Vieweg/Hochtlen, Kunststoffhandbuch, Volume 7, Polyurethane, Carl-Hanser Verlag, Munich 1966). In such hot melt adhesives it is necessary to accept low heat resistance under load for the sake of obtaining a low processing temperature. If, on the other hand, it is desired to obtain bonds which have high stability at high temperatures, conventional hot melt adhesives must be employed at very high application temperatures, which is not always possible.

One solution to this problem is provided by reactive polyurethane systems. The polymer, which has a low viscosity and low molecular weight during processing, undergoes a chemical reaction during processing, whereby its molecular weight and bond strength are increased. Reactive polyurethane systems, may be formulated as either two-component or one-component systems. Two-component polyurethane systems consist of an isocyanate-containing component and an isocyanate reactive component. These two components must be mixed together before processing. This gives rise to adhesives which have a low processing temperature and excellent thermal stability. One disadvantage of these adhesives is the costly method of processing required and the low storage stability and hence short working life of the adhesive mixture once it is ready for use.

The disadvantage of a limited shelf life does not occur to the same extent in true one-component polyurethane systems.

German Auslegeschrift 3,543,120 describes a polyurethane hot melt adhesive which has a low processing viscosity, a long processing time and good thermal stability due to containing liquid polyols. These characteristics are obtained by using so-called masked isocyanates. The hot melt adhesives are prepared as two-component adhesives by mixing a polyisocyanate and a polyol mixture containing the masking agent immediately before use so that the adhesive is formed after it has been applied to the substrate which is to be bonded. This procedure requires considerable technical skill in the mixing technique for the user and is therefore costly. Curing of these adhesives requires high temperatures.

Polyurethane hot melt adhesives which are worked up as one-component systems and are also cross-linked by means of masked isocyanates are described in European Patent 248,658. This reference describes hot melt adhesives based on high melting polyesters which contain aromatic dicarboxylic acids as their main component. The high temperatures required for working up (T>100° to 125° C.) and curing (T=180° C.) these adhesives severely restricts their usefulness, e.g. for bonding plastics. Further, such hot melt adhesives have the disadvantage of softening again at temperatures above 110° C.

U.S. Pat. No. 4,722,969 describes one-component reactive systems which are to be processed at low temperatures but due to the high degree of branching required, the adhesives do not have the degree of flexibility required for flexible substrates, and due to the large amount of catalyst required for achieving the necessary rapid curing, the products have a storage stability of only two months at room temperature.

Masked isocyanates as components of an adhesive system are also described in U.S. Pat. No. 4,798,879. This patent describes a two-component adhesive system which sets rapidly at room temperature and which consists of a prepolymer containing masked isocyanate groups and primary amines as hardeners. It is all the more surprising that according to the invention described below, storage stable one-component systems may be obtained from prepolymers containing masked isocyanate groups and aminic or alcoholic hardeners.

It was an object of the present invention to provide adhesive compounds with good storage stability at elevated temperatures, low melt viscosity and rapid increase in viscosity at a relatively low curing temperature and rapid hardening.

DESCRIPTION OF THE INVENTION

The present invention is directed to predominantly linear polyurethane adhesives which can be cross-linked by heat and are at least partially crystalline at room temperature, comprising:

a) a polyurethane prepolymer which contains masked isocyanate groups and is at least partially crystalline, and is prepared by reacting:
   a1) at least one at least partially crystalline organic polyhydroxyl compound having a molecular weight above 400, preferably above 500, more preferably from 1500 to 10,000 and most preferably from 2000 to 5000, and being selected from the group consisting of polyesters and polycarbonates, and
   a2) a polyisocyanate component consisting of at least one organic polyisocyanate having a functionality of at least 2, and preferably from 2 to 2.7,
   a3) at least one monofunctional isocyanate blocking agent, and
   a4) optionally a polyhydroxyl compound having a hydroxyl functionality of at least 2, preferably from 2 to 4, and most preferably 3 and a molecular weight below 500, and preferably from 62 to 250,
   in which the equivalent ratio of isocyanate groups of component a2) to the sum of isocyanate reactive groups of components a1) and a4) is kept in the range of from 1.1:1 to 3:1, preferably from 1.5:1 to 2.5:1 and most preferably from 1.8:1 to 2.2:1 and the equivalent ratio of the isocyanate groups resulting from the ratio of components a1) and a4) to a2) to the monofunctional blocking agents a3) is kept in the range of from 0.8:1 to 1.15:1, and preferably from 0.95:1 to 1.05:1, and b) at least one low molecular weight amine functional and/or hydroxyl functional chain lengthening or cross-linking agent having a molecular weight of from 32 to 500, and having a functionality of at least 2.

Furthermore, the equivalent ratio of the masked isocyanate groups from component a) to the isocyanate reactive groups of component b) is preferably from 0.8:1 to 2.0:1, more preferably from 0.95:1 to 1.5:1, and most preferably from 1:1 to 1.2:1.

The invention further relates to a process for the bonding of substrates by using polyurethane compounds of the present invention.

The polyurethane prepolymer a) is at least partially crystalline.

Polyhydroxyl compound a1) is at least partially crystalline and has a "crystalline melting range" preferably from 40° C. to 150° C. The term "crystalline melting range" is used here to denote the temperature at which the crystalline segments of the polymer melt and it is determined as the temperature of the main endothermal maximum in a thermal differential analysis, e.g. differential scanning calorimetry (DSC).

The polyester polyols a1) may in particular be linear polyester diols or slightly blanched polyester polyols such as may be prepared in known manner from aliphatic, cycloaliphatic or aromatic dicarboxylic acids such as adipic, suberic, azelaic, sebacic, dodecane dicarboxylic, terephthalic or isophthalic acid or mixtures thereof and polyhydric, in particular dihydric alcohols such as ethylene glycol, diethylene glycol, 1,4-butanediol, 1,6-hexanediol, 1,8-octanediol, 1,10-decanediol, 1,12-dodecanediol or mixtures thereof, together with small quantities of higher functional polyols such as trimethylolpropane or glycerol. The polyhydric alcohols used may, of course, also be cycloaliphatic and/or aromatic di and polyhydroxyl compounds. Instead of the free polycarboxylic acids, the corresponding polycarboxylic acid anhydrides or corresponding polycarboxylic acid esters of lower alcohols or mixtures thereof may be used for the preparation of the polyesters.

The polyester polyols may, of course, also consist of homo- or copolymers of lactones which are preferably obtained by the chemical addition of lactones or lactone mixtures such as butyrolactone, $\epsilon$-caprolactone and/or methyl-$\epsilon$-caprolactone to suitable difunctional and/or higher functional starter molecules such as the low molecular weight polyhydric alcohols mentioned above as starting components for polyester polyols. The polymers of $\epsilon$-caprolactone are particularly preferred.

Hydroxyl-containing polycarbonates may also be used as polyol components a1) e.g. those prepared by the reaction of diols such as 1,4-butanediol and/or 1,6-hexanediol with diarylcarbonates such as diphenylcarbonate or phosgene.

Examples of preferred components a4) include simple polyhydric alcohols such as ethylene glycol, propylene glycol, 1,3-propanediol, 1,4-butanediol, 1,6-hexanediol, trimethylolpropane, glycerol or pentaerythritol. Low molecular weight polyesterdiols may also be used as component a4) e.g. adipic acid-bis-(hydroxyethyl)-ester or low molecular weight diols containing ether groups such as diethylene glycol, triethylene glycol, tetraethylene glycol, dipropylene glycol, tripropylene glycol or tetrapropylene glycol.

The organic polyisocyanates used as starting materials a2) for the process according to the invention may be any organic compounds containing at least two free isocyanate groups. The isocyanates preferably used are diisocyanates of H the formula $X(NCO)_2$ in which X stands for an aliphatic hydrocarbon group having 4 to 12 carbon atoms, a cycloaliphatic hydrocarbon group having 6 to 15 carbon atoms, an aromatic hydrocarbon group having 6 to 15 carbon atoms or an araliphatic hydrocarbon group having 7 to 15 carbon atoms. The following are examples of such preferred diisocyanates: tetramethylene diisocyanate, hexamethylene diisocyanate, dodecamethylene diisocyanate, 1,4-diisocyanato-cyclohexane, 1-isocyanato3,3,5-trimethyl-5-isocyanatomethylcyclohexane, 4,4'-diisocyanatodicyclohexyl-methane, 4,4'-diisocyanato-dicyclohexylpropane-(2,2), 1,4-diisocyanato-benzene, 2,4-diisocyanatotoluene, 2,6-diisocyanato-toluene, 4,4'-diisocyanato-diphenylmethane, 2,4'-diisocyanato-diphenylmethane, p-xylylene diisocyanate and mixtures of these compounds.

A certain proportion of higher functional polyisocyanates conventionally used in polyurethane chemistry and of modified polyisocyanates known per se, such as polyisocyanates containing diimide groups, allophanate groups, isocyanurate groups, urethane groups and/or biuret groups may, of course, also be included.

Monoisocyanates such as phenylisocyanate, hexylisocyanate or dodecylisocyanate may also be used in minor quantities for the preparation of the polyaddition products i.e. in quantities containing up to 10 isocyanate equivalents percent, but in that case premature chain termination must be prevented by also adding higher than difunctional starting components.

The monofunctional blocking agents a3) for isocyanate groups used according to the invention are known and may be aromatic hydroxyl compounds such as phenol, cresols, nonylphenol, naphthols or hydroxyacetophenones; hydroxybenzoic acid esters such as 4-hydroxybenzoic acid ethyl ester or 4-hydroxybenzoic acid methyl ester; oximes such as 2-butanone oxime, acetone oxime or cyclohexanone oxime; enol forms of 1,3-dicarbonyl compounds, e.g. acetylacetone, ethyl acetoacetate or malonic esters; lactams such as $\epsilon$-caprolactam, and $\pm$o diarylamines, e.g. diphenylamine 2-Butanone oxime, 4-hydroxybenzoic acid esters and $\epsilon$-caprolactam are preferred blocking agents. Mixtures of suitable blocking agents may, of course, also be used.

The following are examples of preferred components b): ethylene diamine, hexamethylene diamine, piperazine, 2,5-dimethylpiperazine, 1-amino-3-amino-methyl-3,5,5-trimethylcyclohexane (isophorone diamine) 4,4'-diamino-cyclohexylmethane, 1,4-diaminocyclohexane, bis-(4-amino-3-methylcyclohexyl)-methane, 1,2-diaminopropane, hydrazine, hydrazine hydrate, amino acid hydrazides such as 2-amino-acetic acid hydrazide and bis-hydrazides such as succinic acid bis-hydrazide, aliphatic triamines such as N,N'-di(2-aminoethyl)-amine, aliphatic polyamines such as triethylene tetramine, aromatic polyamines such as 2,4- and 2,6-toluene diamine, 1,2-, 1,3- and 1,4-diaminobenzene, mixtures of 1,3-diamino-2,6-diethyl-4-methylbenzene and 1,3-diamino4,6-diethyl-2-methylbenzene, polyamines obtainable by acid condensation of aldehydes such as formaldehyde with aniline, e.g. 4,4'-, 2,4'-and 2,2'-diamino-diphenylmethane, and higher functional condensation products. Mixtures of the compounds exemplified above may also be used as component b) according to the invention.

The hydroxyl functional chain lengthening and cross-linking agents b) used according to the invention may be, for example, the polyhydroxyl compounds used as component a4). Further examples of polyhydroxyl compounds suitable as components b) include low molecular weight products of addition of ethylene oxide and/or propylene oxide to aliphatic or cycloaliphatic di- or polyols, to aromatic di- or polyols or to primary or secondary mono- or polyamines. The blocked amines known per se in polyurethane chemistry may also be used as component b), i.e. amines blocked to form ketimines (German Auslegeschrift 2,725,589), ketazines (German Auslegeschrift 2,811,148, and U.S. Pat. No. 4,269,748) or amine salts (U.S. Pat. No. 4,292,226). Oxazolidines described, for example, in German Auslegeschrift 2,732,131 or U.S. Pat. No. 4,192,937 also constitute masked amines and may be used as component b).

Other examples of compounds suitable for use as starting components a1), a2), a3) or b) in the process according to the invention are described e.g. in High Polymers, Vol.XVI, "Polyurethanes, Chemistry and Technology" by Saunders-Frisch, Interscience Publishers, New York, London, Volume I, 1962, pages 32 to 42 and pages 44 to 54 and Volume II, 1964, pages 5 to 6 and 198 to 199 and in KunststoffHandbuch, Volume VII, Vieweg-Hochtlen, Carl-Hanser-Verlag, Munich, 1966, e.g. on pages 45 to 71.

Auxiliary agents and additives conventionally used in polyurethane chemistry, including catalysts such as tertiary amines, e.g. triethylamine, benzyl-diethylamine, diazabicyclooctane (DABCO), N-methyl-morpholine or 1,8-diaza-bicyclo-5,4,0-undecene-7 (DBU); and organometallic compounds such as organic tin compounds, e.g. dibutyl tin dilaurate or dimethyl tin dichloride, may be added to the polyurethane compounds according to the invention at any stage in the process of preparation.

Further examples of auxiliary agents and additives include fillers, pigments, stabilizers against photochemical degradation and against oxidation or microbes, and levelling and wetting agents, and the like.

Preparation of the polyurethane compounds according to the invention may be carried out, for example, by preparing an isocyanate prepolymer from components a1) and a2) and optionally a4) in known manner, masking this prepolymer with an isocyanate blocking agent a3) and incorporating the chain lengthening or crosslinking agent b) into the masked polyurethane prepolymer either immediately thereafter or at any subsequent stage. Components a1) to a4) may, of course, be reacted together in any other sequence or in a single reaction step. For obtaining systems suitable for use as polyurethane compounds according to the invention, components a1) to a4) must be adjusted to one another to produce a "crystalline masked prepolymer" by the process according to the invention. Crystalline, masked prepolymers a) are prepolymers whose crystalline soft segments melt endothermally in the temperature range of from 40° to 150° C. according to the differential scanning calorimetry diagram (DSC).

The invention is further illustrated but is not intended to be limited by the following examples in which all parts and percentages are by weight unless otherwise specified.

EXAMPLES

Example 1

920 g of a 1,6-hexanediol polyadipate with OH number 50 are reacted with 200 g of 4,4'-diphenylmethane diisocyanate at 60° C. until a constant isocyanate content of 2.85% (theoretical 2.91%) is obtained. 67.3 g of 4-hydroxy-benzoic acid ethyl ester are added and the reaction is continued at 60° C. until the reaction mixture is free from isocyanate. The prepolymer is poured into Teflon molds and solidifies at room temperature to a hard plate which is easily granulated. The prepolymer contains about 2.70% of masked isocyanate groups.

The DSC diagram of the above prepolymer shows a strong endothermy for melting of the polyester soft segment with a maximum at 55° C.

Separate 100 g portions of the above polymer are mixed, respectively, with a) 2.9 g of 1,4-butanediol + 0.01 g of dibutyl tin dilaurate, b) 2.0 g of glycerol + 0.01 g of dibutyl tin dilaurate and c) 2.9 g of trimethylolpropane + 0.01 g of dibutyl tin dilaurate at 60° C.

The reactive one-component systems described above are stored at 50° C. for 72 hours. All three samples can then be melted at 60° C. and can easily be processed.

Samples stored at room temperature can still be melted and easily worked up after 6 months.

Example 2

1,225 g of a 1,4-Butanediol polyadipate with OH number 50 are reacted with 168 g of hexamethylene diisocyanate at 80° C. After 5 hours at 80° C., the reaction mixture has a constant isocyanate content of 2.95% (theoretical 3.02%). 91.35 g of 2-butanone oxime are added. After a further 4 hours at 80° C., the reaction mixture is free from isocyanate. The prepolymer is poured into a Teflon molds and solidifies at room temperature to form a hard plate which can easily be granulated. The prepolymer contains about 2.85% of masked isocyanate groups.

The DSC diagram of the above prepolymer shows a strong endothermy with a maximum at 48° C. for melting of the polyester soft segment.

Separate 100 g portions of the above prepolymer are mixed at 60° C. with a) 3.45 g of hexamethylene diamine and b) 6.60 g of 4,4'-methylene dianiline.

The resulting one-component mixtures are stored at 50° C. for 72 hours. The free amine content in the one component mixtures is determined before and after storage at 50° C. No significant decrease in the amine content can be detected. The one-component mixtures can be remelted and are easily processed at 60° C. Samples stored at room temperature can still be melted and easily processed after 6 months.

Example 3

1,225 g of a 1,4-butanediol polyadipate with OH number 50 are reacted with 222 g of isophorone diisocyanate at 80° C. After 12 hours at 80° C., the reaction mixture has a constant isocyanate content of 2.85% (theoretical 2.90%). 91.35 g of 2-butanone oxime are added. After a further 3 hours at 80° C., the reaction mixture is free from isocyanate groups. The prepolymer is poured into a Teflon molds and solidifies at room temperature to form a hard plate which can easily be granulated. The prepolymer contains about 2.65% of masked isocyanate groups.

The DSC diagram of the above prepolymer shows a strong endothermy with a maximum at 47° C. for melting of the polyester soft segment.

100 g portions of the above prepolymer are mixed at 60° C. with a) 3.30 g of hexamethylene diamine and
b) 6.25 g of 4,4'-methylene dianiline.

The resulting one-component mixtures are stored at 50° C. for 72 hours. The free amine content in the one component mixtures is determined before and after storage at 50° C. No significant decrease in the amine content can be detected. The one-component mixtures can be remelted and are easily processed at 60° C. Samples stored at room temperature can still be melted and easily processed after 6 months.

Example 4

A mixture of 1,225 g of a 1,6-hexanediol polyadipate with OH number 50 and 13.4 g of trimethylolpropane are reacted with 325 g of 4,4'-diphenylmethane diisocyanate at 65° C. The reaction is continued until a constant isocyanate content of 3.45% (theoretical 3.50%) is obtained. 118.7 g of 2-butanone oxime are then added and the reaction is continued to an isocyanate content of 0%. The prepolymer is poured into a Teflon mold and solidifies at room temperature to a hard plate which is easily granulated. The prepolymer contains about 3.25% of masked isocyanate groups.

The DSC diagram of the above prepolymer shows a strong endothermy with a maximum at 50° C. for melting of the polyester soft segment.

100 g portions of the above prepolymer are mixed at 60° C. with
a) 8.10 g of bis-(4-amino-cyclohexyl)-methane,
b) 6.85 g of a 70:30 mixture of 1,3-diamino-2,6-diethyl-4-methylbenzene and 1,3-diamino-4,6-diethyl-2-methylbenzene and
c) 9.20 g of bis-(4-amino-3-methyl-cyclohexyl)-methane.

The resulting one-component mixtures are stored at 50° C. for 72 hours. The free amine content of the one component mixtures is determined before and after storage at 50° C. No significant decrease in the amine content can be detected. The one-component mixtures can be remelted and are easily processed at 60° C. Samples stored at room temperature can still be melted and easily processed after 6 months.

Example 5

2000 g of a 1,6-hexanediol polyadipate with OH number 28 are reacted with 250 g of 4,4'-diphenylmethane diisocyanate at 65° C. After 5 hours at 65° C., the reaction mixture has a constant isocyanate content of 1.85% (theoretical 1.87%). 91.35 g of 2-butanone oxime are added. After a further 3 hours at 60° C., the reaction mixture is free from isocyanate. The prepolymer is poured into a Teflon mold and solidified at room temperature to a hard plate which is easily granulated. The prepolymer contains about 1.80% of masked isocyanate groups.

The DSC diagram of the above prepolymer shows a strong endothermy with a maximum at 55° C. for melting of the polyester soft segment.

100 g portions of the above prepolymer are mixed at 60° C. with
a) 4.30 g of bis-(4-amino-cyclohexyl)-methane,
b) 3.60 g of a 70:30 mixture of 1,3-diamino-2,6-diethyl-4-methylbenzene and 1,3-diamino-4,6-diethyl-2-methylbenzene, and
c) 4.90 g of bis-(4-amino-3-methyl-cyclohexyl)-methane.

The resulting one-component mixtures are stored at 50° C. for 72 hours. The free amine content of the one component mixtures is determined before and after storage at 50° C. No significant decrease in the amine content can be detected. The one-component mixtures can be remelted and are easily processed at 60° C. Samples stored at room temperature can still be melted and then easily processed after 6 months.

Comparison Example 6

The following example is carried out similarly to Example 3 of European Patent 248,658 but with 2-butanone oxime as blocking agent:

370 g of a mixed ester of 1,6-hexanediol, terephthalic acid and adipic acid used in a molar ratio of 8.5:5:2.5 and having an OH number of 56 and 94 g of diphenylmethane diisocyanate are reacted at 110° C. until a constant isocyanate content of 3.40% (theoretical 3.46%) is obtained. 33.1 g of 2-butanone oxime are then added and stirring is continued for a further 2 hours at 95° C. At the end of this time, the reaction mixture is free from isocyanate groups. The prepolymer is poured into a Teflon mold and solidifies at room temperature to a hard plate which is easily granulated. The prepolymer contains about 3.20% of masked isocyanate groups.

The DSC diagram of the above prepolymer shows a strong endothermy with a maximum at 90° C. for melting of the polyester soft segment.

The above mixture is stored at 50° C. for 72 hours. The one-component mixture can be remelted and can be processed at 60° C.

Example 7

1000 g of a 1,6-hexanediol polyadipate with OH number 37.5 are reacted with 165 g of 4,4'-diphenylmethane diisocyanate at 65° C. After 4 hours at 65° C., the reaction mixture has a constant isocyanate content of 2.30% (theoretical 2.38%). 75.8 g of $\epsilon$-caprolactam are added. After a further 2 hours at 70° C., the reaction mixture is free from isocyanate groups. The prepolymer is poured into a Teflon mold and solidifies at room temperature to a hard plate which is easily granulated. The prepolymer contains about 2.15% of masked isocyanate groups.

The DSC diagram of the above prepolymer shows a strong endothermy with a maximum at 55° C. for melting of the polyester soft segment.

100 g of the above prepolymer are mixed at 600° C. with
a) 5.40 g of bis-(4-amino-cyclohexyl)-methane,
b) 4.55 g of a 70:30 mixture of 1,3-diamino-2,6-diethyl-4-methylbenzene and 1,3-diamino-4,6-diethyl-2-methylbenzene
c) 6.10 g of bis-(4-amino-3-methyl-cyclohexyl)-methane and
d) 1.75 g of N,N-di-(2-aminoethyl)-amine.

The resulting one-component mixtures are stored at 50° C. for 72 hours. The free amine content of the one component mixtures is determined before and after storage at 50° C. No significant decrease in the amine content can be detected. The one-component mixtures can be remelted and are easily processed at 60° C. Samples stored at room temperature can still be melted and easily processed after 6 months.

Example 8

The adhesive strengths of the one-component adhesive compounds were measured in accordance with DIN 53 283, "Determination of the adhesive strengths of single shear overlap bonds (shear tension test)". The parts to be bonded were test samples of glass fiber reinforced polyesters (SMC).

| Example | Heating temperature (°C.) | Heating time (min.) | Firmness* | Tensile strength (MPa) |
| --- | --- | --- | --- | --- |
| 1b | 110 | 30 | + | 4.4 |
| 1c | 110 | 30 | + | >5 |
| 4a | 110 | 20 | + | >5 |
| 4b | 110 | 20 | + | 3.8 |
| 4c | 110 | 20 | + | 3.1 |
| 5a | 110 | 20 | + | >5 |
| 5b | 110 | 20 | + | 3.5 |
| 5c | 110 | 20 | + | >5 |
| 6 | 110 | 20 | − | 4.5 |
| 6 | 110 | 30 | − | 4.8 |
| 6 | 180 | 30 | − | >5 |
| 7a | 160 | 15 | + | >5 |
| 7b | 160 | 15 | + | 4.5 |
| 7c | 160 | 15 | + | >5 |

*Firmness at 110°C.
+ Firm
− Not removable from the mold

By "firmness" is meant the ability to be removed from the mold after the heating process.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Predominantly linear polyurethane adhesives which can be cross-linked by heat and are at least partially crystalline at room temperature, comprising:
   a) a polyurethane prepolymer which contains masked isocyanate groups and is at least partially crystalline, and is prepared by reacting:
      a1) at least one at least partially crystalline organic polyhydroxyl compound having a molecular weight above 400, being selected from the group consisting of polyesters and polycarbonates, and
      a2) a polyisocyanate component consisting of at least one organic polyisocyanate having a functionality of at least 2,
      a3) at least one monofunctional isocyanate blocking agent, and
      a4) optionally a polyhydroxyl compound having a hydroxyl functionality of at least 2 and a molecular weight below 500,
   in which the equivalent ratio of isocyanate groups of component a2) to the sum of isocyanate reactive groups of components a1) and a4) is kept in the range of from 1.1:1 to 3:1, and the equivalent ratio of the isocyanate groups resulting from the ratio of components a1) and a4) to a2) to the monofunctional blocking agents a3) is kept in the range of from 0.8:1 to 1.15:1, and
   b) at least one low molecular weight amine functional and/or hydroxyl functional chain lengthening or cross-linking agent having a molecular weight of from 32 to 500, and having a functionality of at least 2.

2. The polyurethane adhesive of claim 1 wherein the polyhydroxyl compound a1) has a molecular weight of from 2000 to 5000.

3. The polyurethane adhesive of claim 1 wherein component a1) is an adipic acid ester of 1,6-hexanediol or 1,4-butanediol.

4. The polyurethane adhesive of claim 1 wherein said isocyanate a2) is difunctional.

5. The polyurethane adhesive of claim 1 wherein said isocyanate a2) is selected from the group consisting of hexamethylene diisocyanate, 1,4-diisocyanato cyclohexane, 4,4'-diisocyanato dicyclohexyl methane and 4,4'-diisocyanato diphenylmethane.

6. The polyurethane adhesive of claim 1 wherein the blocking agent a3) is selected from the group consisting of nonyl phenol, hydroxy acetophenone, hydroxy benzoic acid ester, -hydroxybenzoic acid ethyl ester, 4-hydroxybenzoic acid methyl ester, 2-butanone oxime, malonic ester and ε-caprolactam.

7. In a process for bonding substrates by applying a polyurethane adhesive to one or both of the substrates to be bonded, bringing the substrates together, and allowing the adhesive to cure, the improvement wherein the adhesive is the adhesive of claim 1.

* * * * *